United States Patent [19]

Wallander

[11] Patent Number: 4,853,116
[45] Date of Patent: Aug. 1, 1989

[54] DEVICE FOR COLLECTING AND DISCHARGING SOLID MATTER

[75] Inventor: Carl O. Wallander, Gothenburg, Sweden

[73] Assignee: Hydropress Wallander & Co., Sweden

[21] Appl. No.: 80,321

[22] Filed: Jun. 12, 1987

Related U.S. Application Data

[63] Continuation of Ser. No. 769,546, Aug. 26, 1985, abandoned, which is a continuation-in-part of Ser. No. 507,025, Jun. 23, 1983, abandoned.

[30] Foreign Application Priority Data

Jul. 5, 1982 [SE] Sweden ............................ 82-04127
May 24, 1985 [SE] Sweden ............................ 8502582

[51] Int. Cl.⁴ .......................................... B01D 33/00
[52] U.S. Cl. .................................. 210/104; 198/776; 210/145; 210/155; 210/158
[58] Field of Search ................. 198/496, 774, 776; 210/97, 143, 145, 104, 154–156, 159, 161, 170, 357, 359, 405, 456, 158

[56] References Cited

U.S. PATENT DOCUMENTS

| 1,698,387 | 1/1929 | Broome | 210/154 |
| 1,734,813 | 11/1929 | Knowles | 210/154 |
| 1,773,576 | 8/1930 | Downes | 210/154 |
| 1,807,564 | 12/1905 | Lorillard | 198/776 |
| 2,128,345 | 8/1938 | Briggs | 210/162 |
| 2,792,929 | 5/1957 | Magnuson et al. | 198/218 |
| 3,147,221 | 9/1964 | Johnston | 210/456 |
| 3,567,024 | 3/1971 | McCormick | 210/456 |
| 3,834,538 | 9/1974 | Laman | 210/154 |
| 3,872,006 | 3/1975 | Abel | 210/158 |
| 3,982,338 | 9/1976 | Dick et al. | 37/102 |

FOREIGN PATENT DOCUMENTS

| 98820 | 1/1984 | European Pat. Off. | 210/154 |
| 3003827 | 8/1981 | Fed. Rep. of Germany | 210/154 |
| 343548 | 3/1972 | Sweden . | |
| 1371573 | 10/1974 | United Kingdom . | |

Primary Examiner—Peter Hruskoci
Attorney, Agent, or Firm—Ostrolenk, Faber, Gerb & Soffen

[57] ABSTRACT

A device for collecting and discharging solid matter from a liquid-solid mixture in a waste collecting stream having a grid structure including alternate stationary and displaceable bars, the displaceable bars being interconnected so as to rotate as one unit, and a drive mechanism used to impart rotational motion to said displaceable bars.

16 Claims, 8 Drawing Sheets

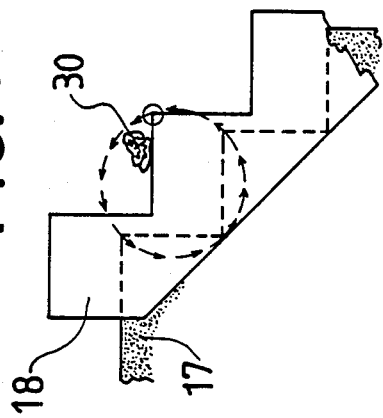
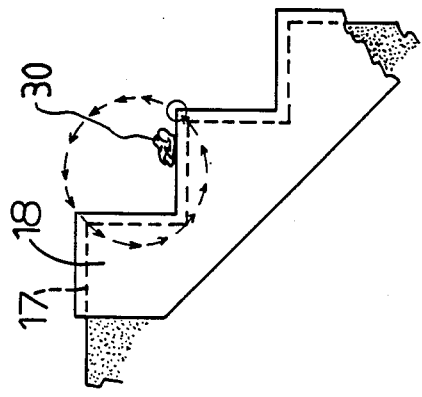
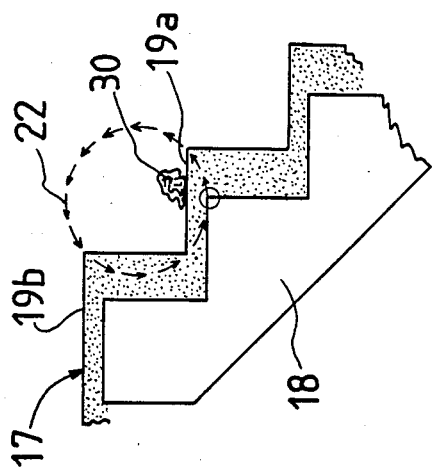
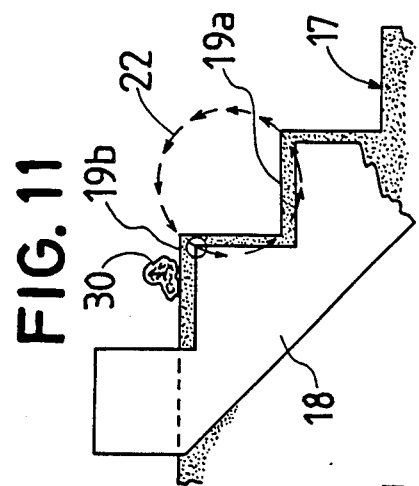
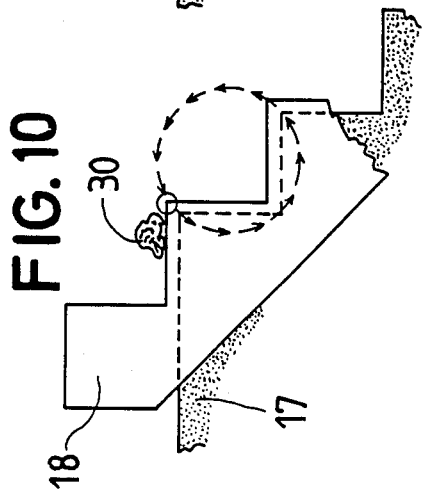
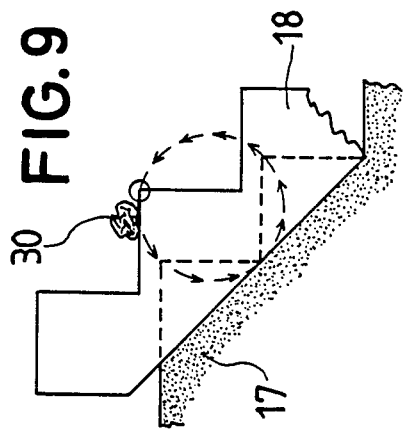

DEVICE FOR COLLECTING AND DISCHARGING SOLID MATTER

This is a continuation of application Ser. No. 769,546, filed Aug. 26, 1985, now abandoned, which is a continuation-in-part of application Ser. No. 507,025, filed June 23, 1983, now abandoned.

BACKGROUND OF THE INVENTION

The present invention refers to a device for collecting and discharging solid matter, flowing in conduits such as, for example, sewers.

The aim of the invention is to provide a simple and efficient device for collecting and discharging waste matter with a minimum of disturbance in the flow in the conduit and having sufficient capacity for use also with large conduits and culverts.

Previously known devices for collecting and discharging refuse have included a stationary grid arranged transversely with respect to the conduit, cooperating with a vertically reciprocal fork device, or with continuous filter webs of different designs and mesh widths. For operational efficiency it is unfavorable to have shafts, pulleys and other parts of the driving mechanism below the water level, as fibrous waste matter easily collects upon such parts.

The fork devices have certain advantages, but as parts of the driving mechanism preferably should not project below the water level, a rather high mounting structure will be required. The height thereof will increase with the depth of the conduit, as well as with the level of the discharge for the collected matter.

The continuous filter webs suffer from certain disadvantages. The downwardly moving portion of the web will always turn its inward face towards the direction of water flow. This means that particles having passed through the upwardly moving portion of the web may be caught upon the inward face of the web, and will be pressed into the same when the web passes over the lead rollers or the like.

Grid structures including reciprocal bars are known in the art, but they have not operated satisfactorily in conduits, neither with respect to collecting capacity, nor with respect to simplicity and reliability.

SUMMARY OF THE INVENTION

In order to overcome the disadvantages mentioned above, the present invention, in a broad sense, is embodied in a device for collecting and discharging solid matter, especially solids from a stream, flowing in conduits, and comprising a grid structure extending into the conduit. The device is characterized by the grid structure arranged obliquely with respect to the flow of the liquid-solid stream, and includes alternate stationary bars and displaceable bars. The edges of said bars are uniformly stepped, and turned towards the flow direction of the water. The displaceable bars are interconnected to form at least one unit, and are operated by a mechanism adapted to impart a movement upon the displaceable bars so any point adapted to collect and to discharge matter performs a closed circuitous path including, a vertical component of movement within each path.

The inclination of the bars is advantageously selected so the terraces of the steps are, in use, substantially horizontally oriented, the terraces being about as broad as the steps are high.

The displaceable bars, within each unit, are preferably interconnected by a beam structure running transversely below the bars, the operating mechanism comprising a pair of rods projecting from the beam structure and arranged substantially perpendicularly to the plane of the bars, as well as a further rod attached to each displaceable bar located outmost in the unit of bars, said bars each carrying an eccentric disc, interconnected in pairs by chains and driven by a common power source so as to impart a circular motion to the displaceable bars when the operating mechanism is engaged.

In a preferred embodiment the top of the grid communicates with a further conveyor preferably a compacting conveying, for removing the collected matter.

BRIEF DESCRIPTION OF THE DRAWINGS

FIGS. 6–11 show interrelated positions of the two bar parts of FIG. 4 during one operating cycle.

DESCRIPTION OF A PREFERRED EMBODIMENT

Figure 1:
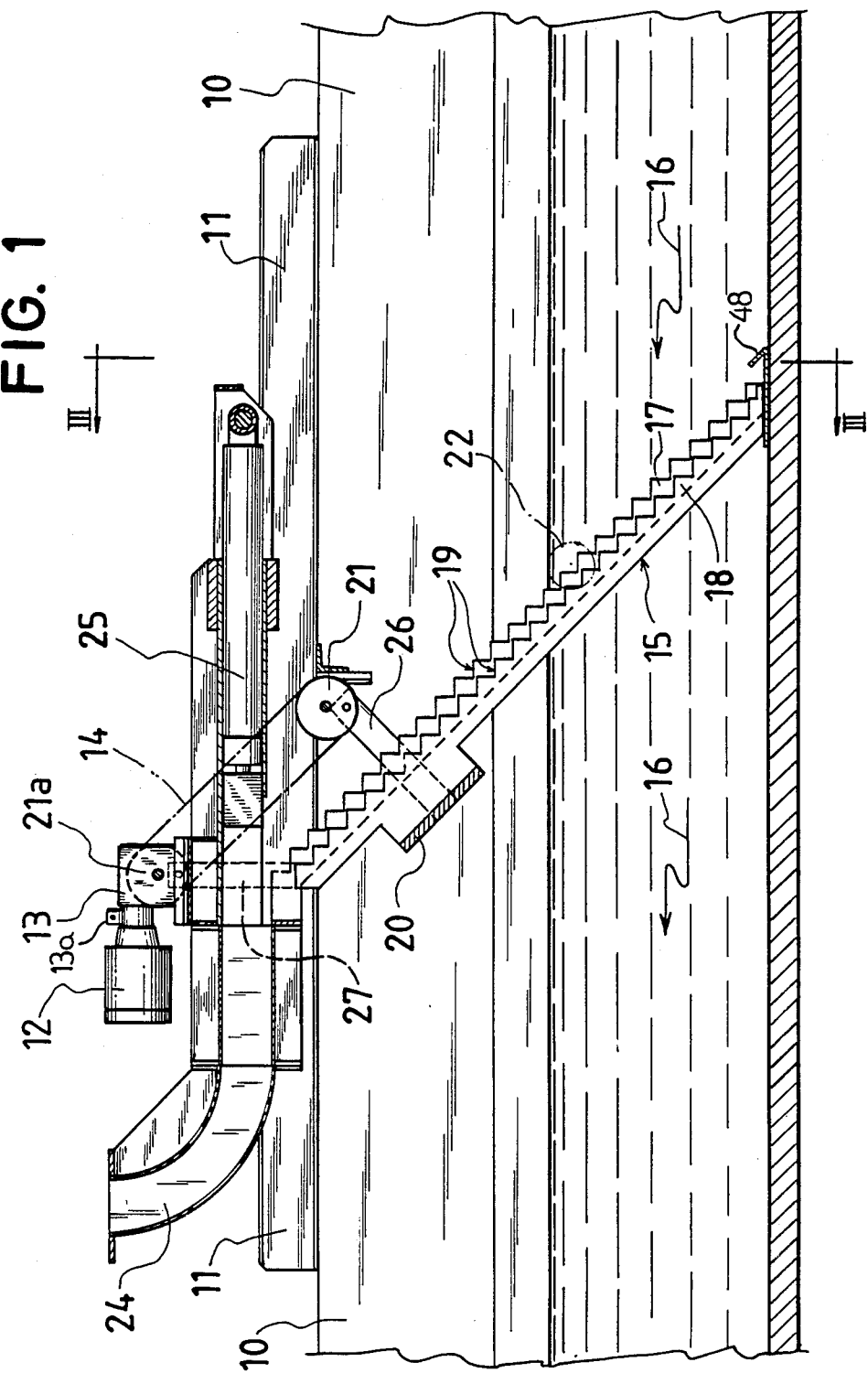
FIG. 1 schematically shows an elevation of a collecting and discharging device according to the invention mounted in a conduit.
Figure 2:
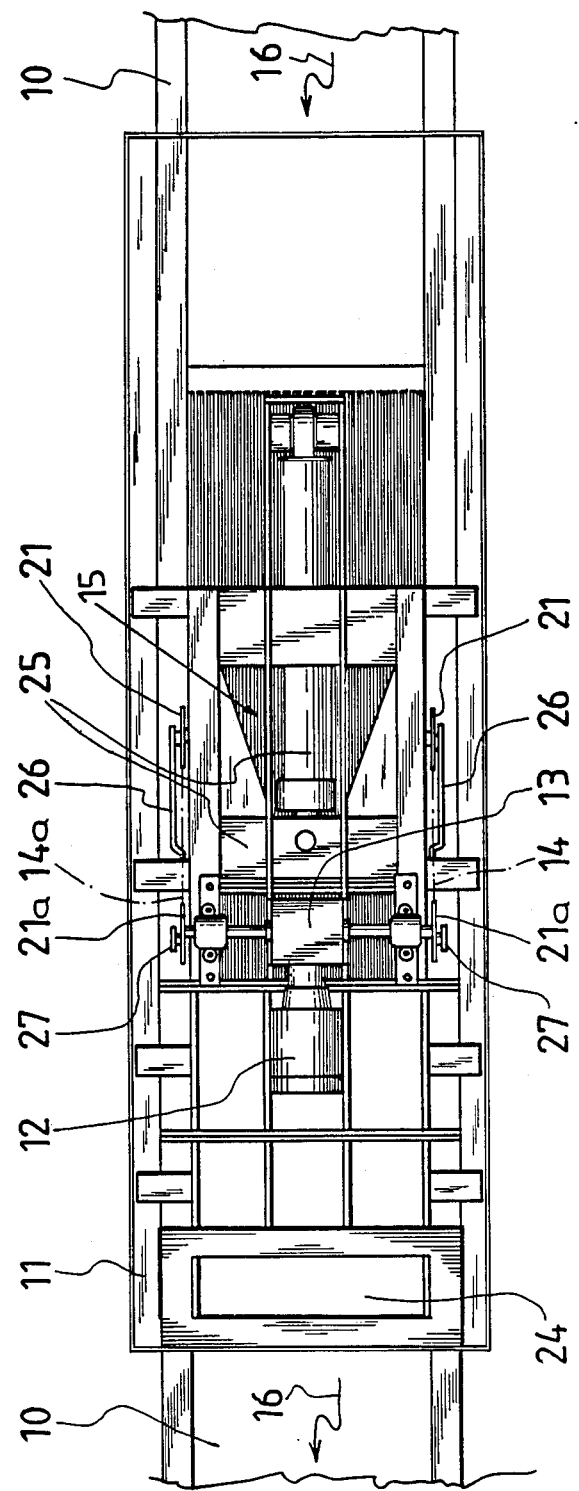
FIG. 2 shows the device according to FIG. 1, as viewed from above.
Figure 3:
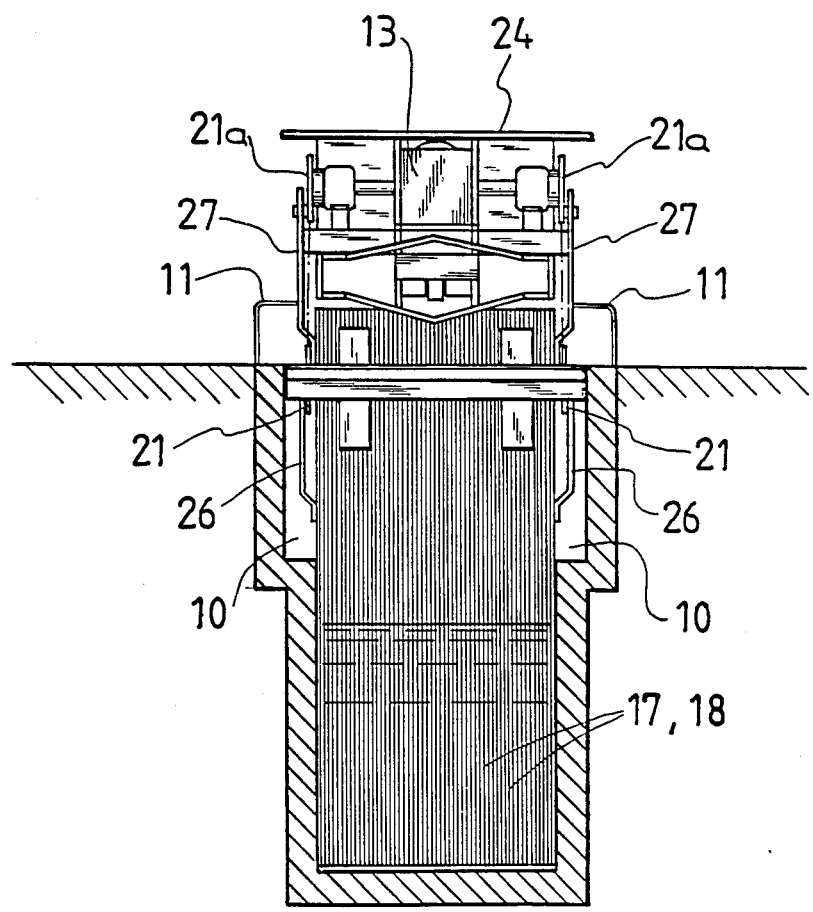
FIG. 3 shows an end view of the device according to line III—III in FIG. 1.
Figure 4:
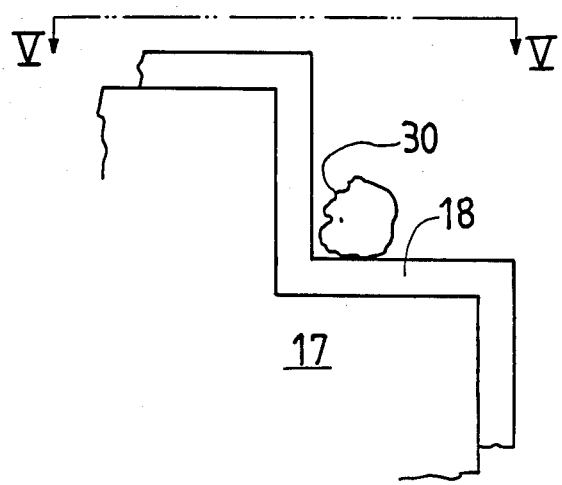
FIG. 4 shows a side view of parts of two bars.

In the drawings reference 10 denotes a conduit, in which a collecting and discharging device 15, comprising a frame 11 and a driving motor 12 with associated gear box 13 driving a pair of chains 14, 14a, is positioned.

The device 15 comprises a number of parallel bars having stepped edges turned towards the flow of water indicated by the arrow 16. Every second bar 17 is stationary and every second bar 18 is displaceable. The bars will thus form one stationary and one displaceable grid.

The bars extend the full breadth of the conduit 10, and form a combined sieve and transporter. The inclination of the bars is selected so the terraces 19 at the stepped bars are located substantially horizontal, when the device is mounted for operation in the conduit 10. The terraces 19 may possibly be given a slight inclination inwards so matter resting thereon does not show any tendency to fall off the terraces The terraces 19 are about as broad as the height of the steps.

A circular movement is imparted to the displaceable bars 18, providing scissoring movement in relation to the stationary bars 17, and as will be evident from the following description, solid matter collecting at the grid structure will be gradually moved upwards along the bars.

Figure 5:
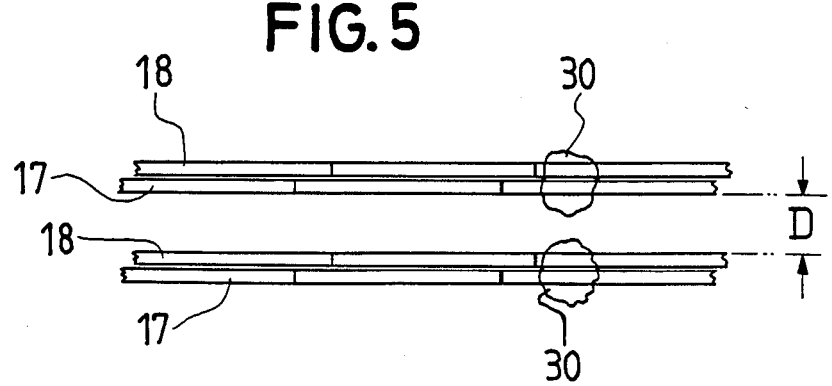
FIG. 5 shows a view as seen from above of the bars in FIG. 4 as shown in line V—V.

One displaceable bar 18 is preferably located adjacent to one stationary bar so as to be guided thereby. The distance D between a displaceable bar and a stationary bar in an adjacent pair of bars can be selected with respect to the degree of sieve action desired. (FIG. 5.) This selection of the distance between the stationary bars 17 and the displaceable bars 18 insures very fine-mesh grid structure not obtainable with other designs having a displaceable bars.

The solid matter from a liquid-solid mixture flowing through a waste collecting stream is often agglomerated into lumps 30, which are first caught at the vertical sides of the steps, and are pressed against the same by the flow of water.

As the vertical sides of two adjacent steps move in relation to each other the lumps 30 are gradually pushed upwards and finally slide onto the adjacent terrace, whereupon the climb along the following vertical sides will start.

That will be best illustrated in FIGS. 6–11.

The displaceable bars 18 are mounted upon a beam structure 20 extending below the bars. In very broad conduits there may be two or more like units with independent driving means. As shown in FIG. 1, a connecting bar 26 extends outwardly, about perpendicularly to the place of the bars at each end of the beam structure 20. Each rod connects at its distal end to an eccentric disc 21.

Each of the two outermost displaceable bars 18 carries an upwardly directed plate 27 connected to an eccentric disc 21a.

Each pair of eccentric discs 21, 21a, positioned on each side of the group of displaceable bars 18 is interconnected by chains 14, 14a which as is mentioned above are driven by the power source 12, 13.

The mounting of the displaceable bars 18 is such that they will follow the movements of the eccentric discs, which means that any point at the terraces 19 of the steps will move in a closed circuitous path 22.

Refuse matter, caught by the grid formed by the bars will, due to the specific relative movement between adjacent terraces 19 at the bars, which provides a vertical component of movement, be successively pushed upwards along the stationary bars 17, as the displaceable bars perform their collecting and discharging movements.

The pattern of movement is illustrated in FIGS. 6–11, which show portions of two adjacent bars 17 and 18 during various steps in a movement cycle.

The stationary bar 17 is shaded, and the displaceable bar 18 is supposed to be in front of the stationary bar, as viewed in the drawings.

As a point of interest the corner between the terrace and the vertical side in the displaceable bar is used, and in FIG. 6 a lump of refuse 30 rests upon terrace 19a of the stationary bar 17. The corresponding terrace of the displaceable bar 18 is located below and inside of the step in bar 17.

In FIG. 7 the step in bar 18 has moved outwards and upwards and has lited the lump 30 from terrace 19a.

This movement continues during the following phases of the circuitous path 22 illustrated in FIGS. 8 and 9 during which the lump 30 is lifted still higher. In FIG. 10 the step starts to move inwards/downwards.

In FIG. 11 the terrace of bar 18 has slid below the terrace of bar 17, and the lump 30 is not deposited upon the terrace 19b of bar 17.

This movement will continue until the lump reaches the top of the grid structure. It is anticipated that the movement provided by the power source 12, chains 14, 14a, and each pair of eccentric discs 21, 21a will enable the displaceable bars to rotate at a speed in a range of approximately five (5) to sixty (60) rotations per minute, as provided by variable speed drive 13a, and to transport waste materials at a rate in a range of approximately one (1) to twenty (20) feet per minute. Additionally, the variable speed drive is used to alter the removal of waste products depending on what material is sought to be filtered.

When the collector matter reaches the upper end of the conveyor it is transferred into a delivery conduit 24, due to the action of a reciprocal piston compactor 25 of arbitrary known kind.

Figure 12:
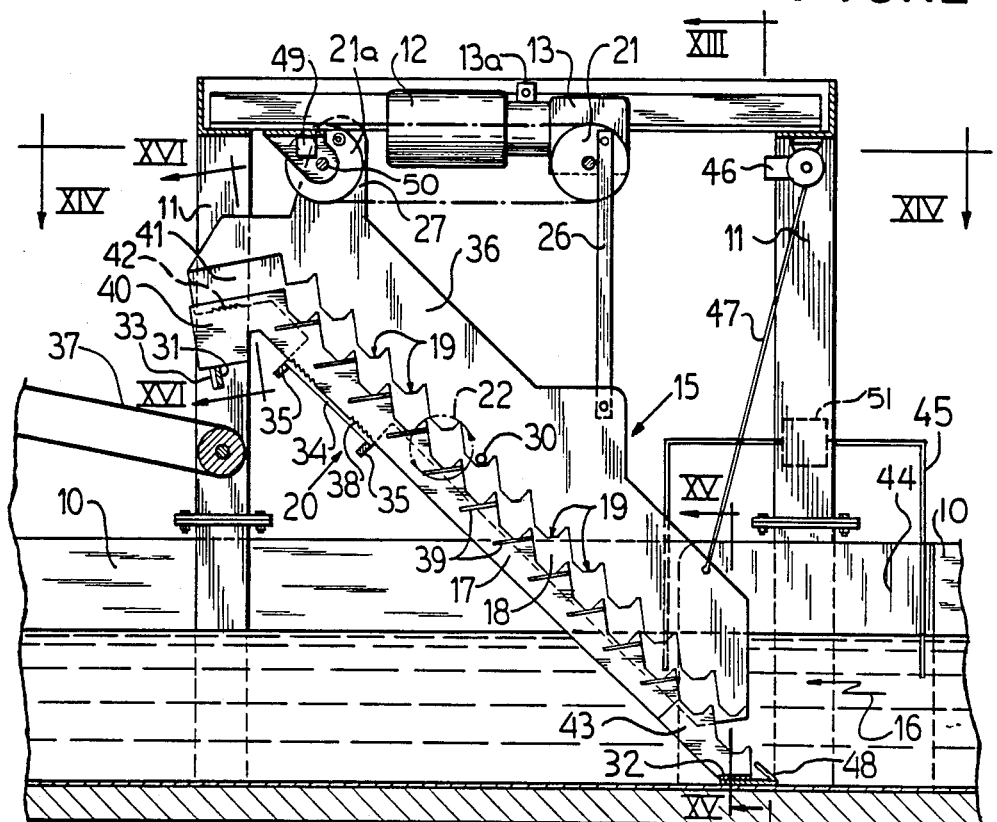
FIG. 12 shows a side view partly in section of a modified device according to the invention.
Figure 14:
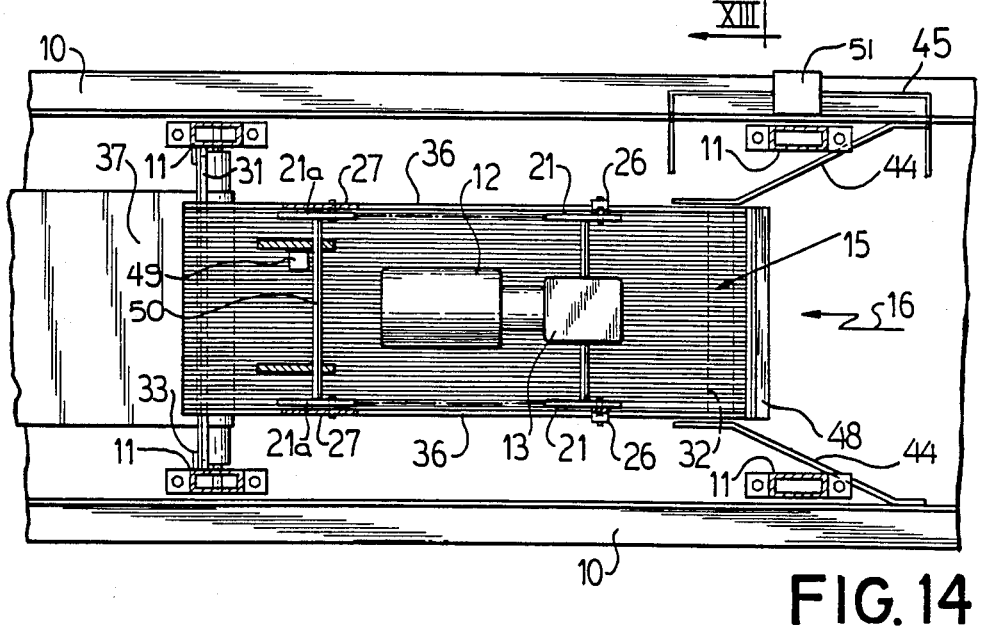
FIG. 14 shows on a larger scale a top view of the stationary and displaceable bars in the device according to a modified embodiment as shown in Section XIV—XIV in FIG. 12.
Figure 13:
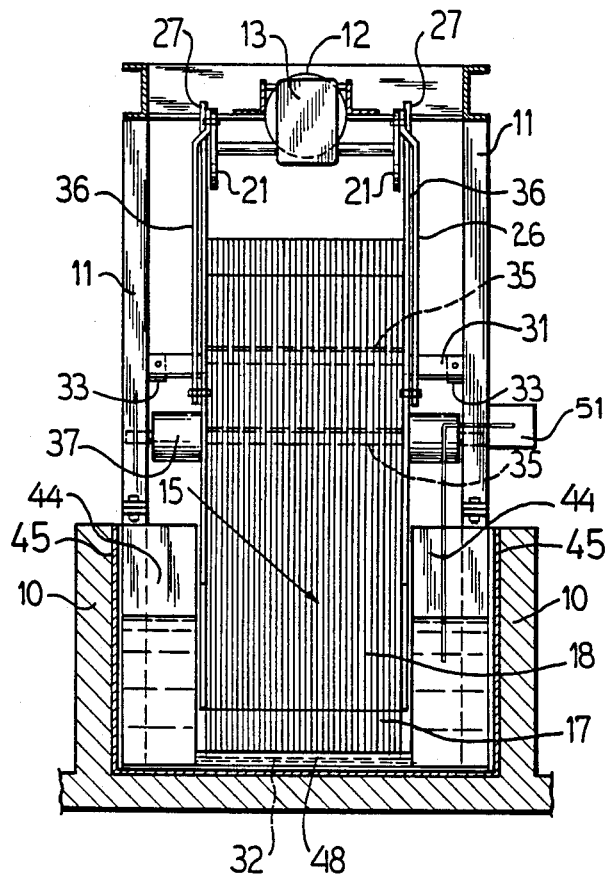
FIG. 13 is a section according to the line XIII—XIII in FIG. 12.

In the embodiment shown in FIGS. 12 and 13 the frame 11 of the collecting and discharging device according to the invention is placed in a conduit 10 into which the water to be cleaned is conveyed. The stationary bars 17 of the grid are at their upper and lower ends connected to each other by means of connecting members in the form of flat bars 31 and 32 welded to the lower edge, at which the structure of stationary bars in its upper part rests on and is attached to a tranverse beam 33, while the lower part rests on the bottom of the conduit 10. The displaceable bars 18 also make a beam structure 20 and are for this purpose provided with a downwards projecting portion 34, on the underside of which transverse connecting members in the form of flat bars 35 are welded. The outermost bars in the moving bar grid are designed as side plates 36 with a larger height than the other bars and lack the terraces 19. The side plates 36 are also welded to the connecting members 35. The structure of displaceable bars 18 is supported by the side plates 36 by way of connecting bars 26 pivoted thereto and a connecting plate 27 arranged with each side plate. The connecting bar 26 and connecting plate 27 are flexibly mounted to the eccentric discs 21, 21a. The object of the side plates 36, which limit the lateral movement of the grid is to prevent the discharged lump 30 from falling down along the sides of the grid and back to the filtered liquid. Flow deflectors 44, attached to anchorage rails 45 embedded in the conduit 10, extend from the side walls of the conduit 10 and overlap the side plates 36 so that the water is guided towards the collecting and discharging device 15. The construction with stationary flow deflectors 44 offers great advantages also with respect to mounting since the entire structure can be manufactured and mounted in a factory. The anchorage rail 45 is a means to locate and accurately install the collecting and discharging device 15 in a conduit. In case of damage to the stationary or displaceable bars, they may be replaced with relative ease.

Waste water and the like often contains large amounts of hair and fibers, but also plastic bars and the like, which can collect behind the support structures of the bars—the connection members 31, 33, 35 —so that the bars 17, 18 become blocked or plugged in a relatively short time or will even obstruct or prevent a relative movement between the bars. In order to overcome the problem of transporting the discharged lumps 30 away from the uppermost step, so that it can be removed by a conveyor, e.g., an endless band 37, and further to prevent the bars 17, 18 from becoming blocked, the stationary bars 17 have on their undersides, remote from the steps, saw teeth 38 or the like, at least at the portions at the bars 17 located just opposite the connecting members 35 of the displaceable bars 18. Each time the displaceable bars make a working stroke, i.e., a closed circular path of movement 22, the saw teeth 38 will tear loose eventual objects stuck on the connecting members 35. A further cleaning effect between the bars is provided bymeans of distance and cleaning members 39 attached thereto and which preferably are arranged in the flow direction of the water and welded to the two flat sides of the stationary bars 17. Depending on the kind of waste water which is to be cleaned the cleaning members 39 may be attached on a level with and substantially parallel to the "horizontal" terrace 19 of the bars 17, but it is also possible to arrange these more sparsely at every other or every third terrace.

Figure 16:
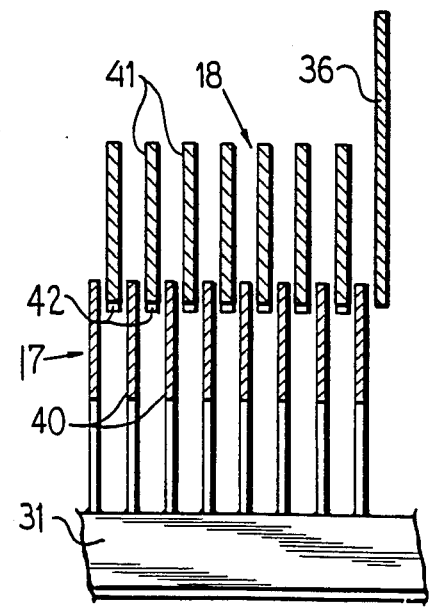

The continuous discharge of the material, after it has reached the uppermost step is provided by means of extended portions 40 and 41 arranged at the upper end of the stationary bars 17 as well as the displaceable bars 18, said portions being slightly inclined in the direction from the uppermost step to provide optimal discharge of captured material. In order to prevent objects from being stuck between the bars, extended portions 40, 41 are within this area designed with a thickness such that the space between the stationary bars 17 is substantially filled out, so that there is only a small clearance left, as is shown in FIG. 16. For preventing hair and other objects from collecting in the connecting members 31 of the bars and the transverse beam 33 also within this area, the lower edges of the displaceable bars 18 are preferably provided with a second set of saw teeth 42, which in the same way as the saw teeth 38, at each working stroke will come so close to the connecting members 31, 33 that a cleaning is performed.

Figure 15:
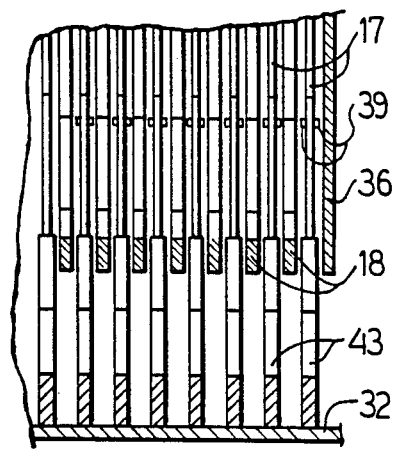
FIGS. 15 and 16 show sections according to the lines XV—XV and XVI—XVI in FIG. 12.

For preventing opening of the lowermost part of the grid corresponding to an enlarged slot width at the upward stroke of the displaceable bars, and thus allowing larger objects to pass through these slots, the stationary bars 17 are at their lower end designed with distance plates 43, as can be seen in FIG. 15, so that when the displaceable bars are in their lower position the slots in the lowermost part of the grid are essentially blocked. When the displaceable bars 18 are in their uppermost position, the slot opening will be maintained at desired width D.

In order to provide more convenient maintenance for the device 15, there is provided a lifting device such as a winch 46 mounted to frame 11 and having lifting cables 47 attached to lifting drive 46 and to the side plates 36. When service or inspection of the device 15 is required, the winch 46 may be engaged to elevate the submerged portion of the device 15 to a level above the liquid in conduit 10.

Prior to elevating device 15, connecting bar 26 is attached from eccentric disc 21. Cables 47 are connected in such a manner that the device 15 pivots at connecting points 21a and 33.

When the thickness of displaceable bars 18 is wider than desired width D, a brush member 48 is positioned at the bottom of the grid in order to prevent the movement of large lumps 30 from passing between stationary bars 17 when the lowest displaceable bars 18 are in the up position.

To monitor and control proper operating speeds and to insure motion of the displaceable bar grid 18, a motion sensing device 49 is positioned at a tail shaft 50 connected to the eccentric disc 21a. The sensing device 49 detects movement of shaft 50 which is the last moving part in the sequence of operation. As long as shaft 50 is rotating, the device 15 is operating properly.

In order to operate the device 15 at maximum efficiency, a differential level monitoring device 51 is used to engage and disengage the power source 12 by sensing the level of fluid in two separate locations as shown in FIG. 12. As solids accumulate on the grid structure. the level of fluid in the liquid-solid stream will begin to rise. When the fluid reaches a particular level, the power source 12 will be engaged and the device 14 will operate as previously described. When the fluid in the liquid-solid stream falls below a certain level detected by the monitoring device 51, the power source 12 will be disengaged and the process allowed to repeat itself.

Figure 17:
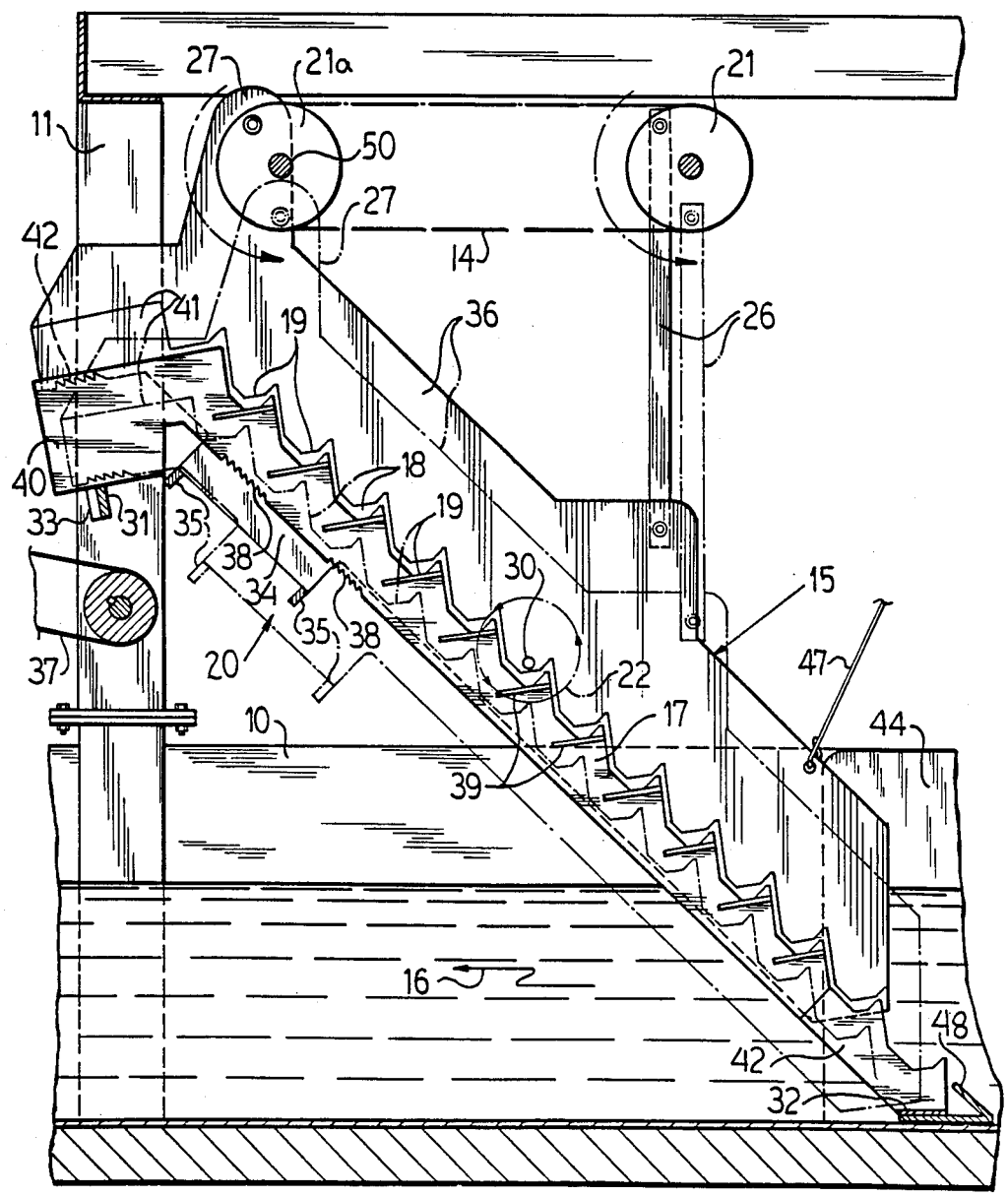
FIG. 17 shows a side view partly in section of a second modified device according to the invention.

Certain kinds of objects which come along with the flowing water can be difficult to tranport on the device according to the invention, since these objects can roll or slip off the horizontal terraces of the steps. Such objects may include bottles, cans, or logs and the like. In order to discharge such objects, as is shown in the embodiment of FIG. 17, the "horizontal" terraces 19 of the stationary bars 17 as well as the displaceable bars 18 in the plane of the bars are tapered towards the center of the terraces. Preferably the terraces are part-circular or V-shaped, but other shapes are also possible. The shape is designed such that entrapment of lumps 30 will not occur. Other variations such as the angle of inclination of device 15 are also possible.

It is evident that the operation as well as the specific bar profiles may be modified within the idea of the invention, and that further variations are possible within the scope of the appended claims.

What I claim is:

1. A device including a grid structure located in a conduit for collecting and discharging solid matter from a waste collecting stream having a liquid-solid mixture therein, comprising:

an inclined grid structure formed by a series of stationary bars defining a stationary grid and a series of displaceable bars defining a displaceable grid, the displaceable bars alternating with the stationary bars, the series of stationary and displaceable bars being configured to form steps, and further with displaceable bars being placed at outermost positions of the series, the stationary and displaceable bars having means to retard the downward movement of solid matter on the inclined grid structure, displaceable vertical side plates affixed to the outermost displaceable bars which move in tandem with the displaceable bars and are displaceable therewith so as to substantially prevent any solid matter from falling along the sides of the grid structure, the stationary bars and the displaceable bars being inclined at an angle such that, in use, any solid matter collected on the bars will be substantially prevented from falling back down the inclined grid structure, means including a beam structure connected to the displaceable vertical side plates and running transversely below the displaceable bars and positioned on the inclined grid structure so as to be above the waste collecting stream for interconnecting at least two of the displaceable bars, means interconnecting the displaceable bars into one unit in the displaceable grid;

saw teeth formed on selected combinations of the displaceable bars and the stationary bars to prevent the displaceable bars from becoming blocked at the beam structure, and driving means having a power source and a connecting means connected to the displaceable vertical side plates such that, when the power source is engaged, the driving means will impart a movement to the displaceable vertical side plates in said at least one unit so that at any point the edges of the displaceable bars will perform a generally closed circuitous path of movement including at least one vertical component of movement within each path to cause solid matter collected at the grid structure to move upwardly along the displaceable bars.

2. The device according to claim 1 in which extension members are positioned at a downward incline at the upper ends of said stationary bars and displaceable bars to facilitate removal of filtered material.

3. A device according to claim 1, in which terraces are formed by the edges of the stationary bars and displaceable bars.

4. A device according to claim 1, including a pair of connecting bars connected above the waste collecting stream at one end to the displaceable vertical side plates formed on the outermost displaceable bars and at the other end to a pair of eccentric discs, said discs in turn being connected to a movement imparting mechanism by means of chains, which are in turn connected to a common power source so that movement will be imparted to both eccentric discs and the connecting bars simultaneously.

5. The device according to claim 1 in which a motion sensing device is positioned on a tail shaft connected to one of said eccentric discs in order to detect and control rotational motion to insure proper operation.

6. The device according to claim 1, wherein the stationary bars include the saw teeth being formed on the bottom of said stationary bars to prevent said stationary bars from becoming blocked at the beam structure.

7. The device according to claim 1 in which the steps are substantially horizontally oriented.

8. The device according to claim 1 in which a monitoring device is connected to said source of power to detect fluid levels in the liquid-solid stream so as to engage and disengage said source of power to provide maximum filtration efficiency with minimum operation.

9. The device according to claim 1 in which distance plates are affixed to a lowermost and uppermost stationary bar.

10. The device according to claim 1 in which distance and cleaning members are attached to said stationary bars so as to provide additional cleaning means for said device.

11. A device for collecting and discharging solid matter from a liquid-solid mixture flowing in a conduit in a waste collecting stream, comprising:

an inclined grid structure formed by a series of stationary bars defining a stationary grid and a series of displaceable bars defining a displaceable grid and alternating with the stationary bars, the bars being arranged obliquely in a conduit adapted to be positioned in a waste collecting stream containing a liquid-solid mixture, with the grid structure having an upper portion of sufficient length so as to extend above the surface of the waste collecting stream, with displaceable bars positioned at the outermost position of the series, a plurality of the stationary bars and the displaceable bars having edges curved back in the general ascending direction of the inclined grid structure so as to be turned toward the flow of the waste collecting stream, the stationary bars and the displaceable bars being arranged to form generally uniform steps having terraces on which solid matter from the waste collecting stream may be deposited, vertical side plates formed on the outermost displaceable bars which move in tandem with the displaceable bars so as to prevent any solid matter from falling along the sides of the grid structures, means interconnecting the displaceable bars into one unit in the displaceable grid, saw teeth formed on selected combinations of the stationary bars so as to prevent the displaceable bars from becoming blocked at the interconnecting means, driving means having a power source and a connecting means connected to the vertical side plates such that, when the power source is engaged, the driving means will impart a movement to the vertical side plates in said one unit so that at any point the edges of the displaceable bars will perform a generally closed circuitous path of movement including at least one vertical component of movement within each path, to cause solid matter collected at the grid structure to move upwardly along the displaceable bars, and a compacting conveyor including a reciprocal piston located so as to receive matter lifted to the upper end of said grid structure and feed it into a delivery conduit.

12. The device according to claim 11 in which the means interconnecting the displaceable bars comprises a beam structure running transversely below the displaceable bars.

13. A device including a grid structure located in a conduit for collecting and discharging solid matter from a waste collecting stream having a liquid-solid mixture therein, comprising:

an inclined grid structure formed by a series of stationary bars defining a stationary grid and a series of displaceable bars defining a displaceable grid, the displaceable bars alternating with the stationary bars, the series of stationary and displaceable bars being configured to form steps, and further with displaceable bars being placed at outermost positions of the series, the stationary and displaceable bars having means to retard the downward movement of solid matter on the inclined grid structure, displaceable vertical side plates affixed to the outermost displaceable which move in tandem with the displaceable bars and are displaceable therewith so as to substantially prevent any solid matter from falling along the sides of the grid structure, the stationary bars and the displaceable bars being inclined at an angle such that, in use, any solid matter collected on the bars will be substantially prevented from falling back down the inclined grid structure, means including a beam structure connected to the displaceable vertical side plates and running transversely below the displaceable bars and positioned on the inclined grid structure so as to be above the waste collecting stream for interconnecting at least two of the displaceable bars, driving means having a power source and a connecting means connected to the displaceable vertical side plates such that, when the power source is engaged, the driving means will impart a movement to the displaceable vertical side plates in the at least one unit so that at any point the edges of the displaceable bars will perform a generally closed circuitous path of movement including at least one vertical component of movement within each path to caorm a generally closed circuitous path of movement including at least one vertical component of movement within each path to cause solid matter collected at the grid structure to move upwardly along the displaceable bars.

14. The device according to claim 13, in which distance and cleaning members are attached to the stationary bars so as to provide additional cleaning means for said device.

15. A device including a grid structure located in a conduit for collecting and discharging solid matter from a waste collecting stream having a liquid-solid mixture therein, comprising:

an inclined grid structure formed by a series of stationary bars defining a stationary grid and a series of displaceable bars defining a displaceable grid, the displaceable bars alternating with the stationary bars, the series of stationary and displaceable bars being configured to form steps, and further with displaceable bars being placed at outermost positions of the series, the stationary and displaceable bars having means to retard the downward movement of solid matter on the inclined grid structure, means including a beam structure running transversely below the displaceable bars and positioned on the inclined grid structure so as to be above the waste collecting stream for interconnecting at least two of the displaceable bars, means interconnecting the displaceable bars into one unit in the displaceable grid;

saw teeth formed on selected combinations of the displaceable bars and the stationary bars to prevent the displaceable bars from becoming blocked at the beam structure, and driving means having a power source and a connecting means connected to the displaceable bars such that, when the power source is engaged, the driving means will impart a movement to the displaceable bars so that at any point the edges of the displaceable bars will perform a generally closed circuitous path of movement including at least one vertical component of movement within each path to cause solid matter collected at the grid structure to move upwardly along the displaceable bars.

16. A device for collecting and discharging solid matter from a liquid-solid mixture flowing in a conduit in a waste collecting stream, comprising:

an inclined grid structure formed by a series of stationary bars defining a stationary grid and a series of displaceable bars defining a displaceable grid and alternating with the stationary bars, the bars being arranged obliquely in a conduit adapted to be positioned in a waste collecting stream containing a liquid-solid mixture, with the grid structure having an upper portion of sufficient length so as to extend above the surface of the waste collecting stream, with displaceable bars positioned at the outermost position of the series, the stationary bars an the displaceable bars being arranged to form generally uniform steps having terraces on which solid matter from the waste collecting stream may be deposited, means interconnecting the displaceable bars into one unit in the displaceable grid, saw teeth formed on selected combinations of the stationary bars so as to prevent the diplaceable bars from becoming blocked at the interconnecting means, driving means having a power source and a connecting means connected to the displaceable bars such that, when the power source is engaged, the driving means will impart a movement to the displaceable bars in said one unit so that at any point the edges of the displaceable bars will perform a generally closed circuitous path of movement including at least one vertical component of movement within each path, to cause solid matter sed circuitous path of movement including at least one vertical component of movement within each path, to cause solid matter collected at the grid structure to move upwardly along the displaceable bars and a compacting conveyor including a reciprocal piston located so as to receive matter lifted to the upper end of said grid structure and feed it into a delivery conduit.

* * * * *